United States Patent [19]
Stultz et al.

[11] Patent Number: 5,557,624
[45] Date of Patent: Sep. 17, 1996

[54] LASER SYSTEM USING U-DOPED CRYSTAL Q-SWITCH

[75] Inventors: Robert D. Stultz, Huntington Beach; Milton Birnbaum, Rancho Palos Verdes, both of Calif.; Marly B. Camargo, Sao Paulo, Brazil

[73] Assignee: Hughes Aircraft Company, Los Angeles, Calif.

[21] Appl. No.: 375,753

[22] Filed: Jan. 20, 1995

[51] Int. Cl.$^6$ .................................................. H01S 3/11
[52] U.S. Cl. ............................ 372/11; 372/25; 372/39
[58] Field of Search ......................... 372/9–11, 24, 372/25, 33, 39–42

[56] References Cited

U.S. PATENT DOCUMENTS

| | | | |
|---|---|---|---|
| 3,754,190 | 8/1973 | Cross | 372/11 |
| 4,682,336 | 7/1987 | Hendrix et al. | 372/10 |
| 5,422,899 | 6/1995 | Freiberg et al. | 372/25 |

OTHER PUBLICATIONS

Marvin J. Weber, "CRC Handbook of Laser Science and Technology," CRC Press, pp. 200–207 (1991). [No Month].
V. P. Mikhailov et al., "Picosecond Spectroscopy of Excited States in Transition–Metal–Ion Doped New Laser Materials," *OSA Proceedings on Advanced Solid–State Lasers*, vol. 15, pp. 320–324 (1993). [No Month].

Robert D. Stultz et al., "$U^{4+}$:$SrF_2$ efficient saturable absorber Q switch for the 1.54 micrometer erbium:glass laser," *Appl. Phys. Lett.*, vol. 64, No. 8, pp. 948–950 (21 Feb. 1994), and erratum sheet to be submitted.

*Primary Examiner*—John D. Lee
*Attorney, Agent, or Firm*—Michael W. Sales; Wanda K. Denson-Low

[57] ABSTRACT

A laser system includes a laser resonator cavity having a resonant axis and an Er:glass, Er:YAG, or other lasing element with an output of from about 1.4 to about 1.65 micrometers within the laser resonator cavity. A flash lamp optically pumps the lasing element to emit light. A Q-switch crystal lies along the resonant axis within the laser resonator cavity. The Q-switch crystal is formed of a host material having a concentration of $U^{2+}$ ions therein, so as to be a saturable absorber of the light emitted by the lasing element. The Q-switch crystal is preferably a $U^{2+}$-doped fluoride such as $U$:$CaF_2$, $U$:$SrF_2$, or $U$:$BaF_2$.

18 Claims, 1 Drawing Sheet

LASER SYSTEM USING U-DOPED CRYSTAL Q-SWITCH

BACKGROUND OF THE INVENTION

This invention relates to lasers, and, more particularly, to a laser system having a passive Q-switch.

A laser is a device that emits a spatially coherent beam of light of a specific wavelength. In a laser, a lasing element is placed within a laser resonator cavity and pumped with an energy source such as a flash lamp. The pumping action produces stored energy and gain within the lasing element. When the gain exceeds the losses so that there is a net light amplification per round trip of the light in the resonator cavity, laser light begins to build up in the cavity, and stored energy is extracted from the lasing element. This energy can be released in the form of a very short, intense light pulse by using a device called a Q-switch.

A Q-switch operates by initially increasing the cavity losses, thus preventing lasing action, while an amount of stored energy and gain is achieved that greatly exceeds the losses that would otherwise exist. The Q-switch losses are then quickly lowered, producing a large net amplification in the cavity, and an extremely rapid buildup of laser light occurs. The light pulse begins to decay after the stored energy in the lasing element has been depleted such that the gain once again drops below the cavity losses.

The Q-switch can be an active device which is controlled or driven by an external signal. The Q-switch can also be a passive structure that has no external control, but instead operates periodically as a result of its own properties. The present invention relates to a laser system using such a passive Q-switch.

saturable absorber can be used as a passive Q-switch. The saturable absorber is a crystal having transmittance properties that vary as a Function of the intensity of the incident light that Falls upon the crystal. When light of low intensity is incident upon the saturable absorber, its light transmittance is relatively low, resulting in high cavity losses. As the incident light energy increases due to the buildup of energy within the laser resonator cavity, the light transmittance of the crystal increases. At some point, the light transmittance increases to a level such that the crystal "bleaches", i.e., becomes transparent, so that the cavity losses become low, and an intense Q-switched light pulse is emitted.

The properties of a saturable absorber crystal depend upon the wavelength of the incident light. A crystal which performs as a saturable absorber at one wavelength typically will not perform in the same manner at significantly different wavelengths. Further, a crystal may act as a saturable absorber for relatively low incident intensities, but higher intensities may damage the crystal. There is therefore an ongoing search for effective saturable absorber crystals for use as Q-switches in particular wavelength ranges.

One of the laser operating ranges of interest is at about 1.5 micrometers wavelength. This wavelength range is of particular importance because light in this range will not damage the human eye at moderate intensities. For example, the Er:glass laser emits light at about 1.53 micrometers wavelength, and can be used as an eye-safe laser. (In this accepted notation, A:B indicates a material having an ion of A doped into a B host crystal.) In the past, Q-switching of the Er:glass laser has been accomplished by an active, rotating prism Q-switch.

There is a need for saturable absorbers operable in the 1.5 micrometer wavelength range for use as passive Q-switches resistant to damage from the passage therethrough of a high-intensity laser beam. The present invention fulfills this need, and further provides related advantages.

SUMMARY OF THE INVENTION

The present invention provides a laser system having a passive Q-switch. The Q-switch material is made of a doped crystal and is operable over a range of wavelengths at about 1.5 micrometers. The laser system can use Er:glass, Er:YAG (yttrium-aluminum garnet), and other types of lasing elements that emit light in this range. The Q-switch material has a high absorption cross section, and can therefore be used with simple plane-parallel, non-focused laser cavities. Specifically, the Q-switch material of the invention can be used with plane-parallel resonator cavities having Er:glass lasing elements due to its high absorption cross section relative to that of Er:glass.

In accordance with the invention, a laser system comprises a laser resonator cavity having a resonant axis, a lasing element within the laser resonator cavity, and means for optically pumping the lasing element. The lasing element emits, under stimulation, light at a wavelength of from about 1.4 to about 1.05 micrometers. The laser system further includes a Q-switch crystal lying along the resonant axis within the laser resonator cavity. The Q-switch crystal comprises a host material having uranium ions doped therein. The Q-switch crystal is a saturable absorber of light of a wavelength of from about 1.4 to about 1.65 micrometers. The Q-switch crystal preferably comprises $U^{2+}$ ions doped into a host material and most preferably comprises a saturable absorber selected from the group consisting of $U^{2+}$-doped calcium fluoride,. $U^{2+}$-doped strontium fluoride, and $U^{2+}$-doped barium fluoride.

The present invention provides an important advance in the art of passive Q-switched laser systems. It provides an eye-safe, passive Q-switch pulsed laser operating in the range of about 1.4 to about 1.65 micrometers light wavelength, which includes commercially important lasing elements such as Er:glass and Er:YAG. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
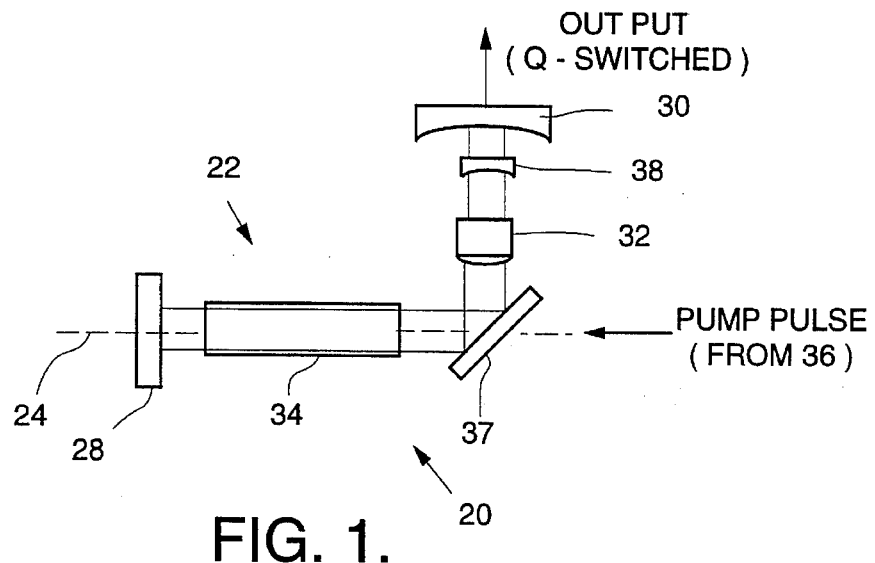
FIG. 1 is a schematic drawing of a first laser system according to the invention.

FIG. 1 schematically illustrates a laser system 20 according to the present invention. The laser system 20 includes a laser resonator cavity 22 having a resonant axis 24. At a first end of the cavity 22 is a flat mirror 28, which has a reflectivity of substantially 100 percent. At a second end of the cavity is a curved outcoupler mirror 30 having a reflectivity that is less than 100 per cent. A focusing lens 32 is optionally provided adjacent to the second end of the cavity.

A lasing element 34 is positioned within the laser resonator cavity 22. The lasing element 34 is in the form of a cylindrical solid rod whose cylindrical axis coincides with the resonant axis 24. When stimulated, the lasing element 34 emits coherent light having a wavelength in a range at about 1.5 micrometers, and more specifically from about 1.4 to about 1.65 micrometers. Examples of materials operable in such a lasing element 34 include Er:glass (erbium doped into a phosphate glass host) and $Er^{3+}$:YAG (erbium doped into a yttrium-aluminum garnet host). These lasing elements are all known in the art.

A means 36 for optically pumping the lasing element is provided. Also provided is an optical element 37 which, at a 45° angle of incidence, has a high transmittance at the pumping wavelength and a high reflectivity at the lasing wavelength.

A Q-switch crystal 38 is positioned within the laser resonator cavity 22 with the resonant axis 24 passing therethrough. The Q-switch crystal 38 lies between the lasing element 34 and the curved outcoupler mirror 30. In the present design, the Q-switch crystal 38 lies between the focusing lens 32 and the curved outcoupler mirror 30, so that the resonant light beam is focused into the Q-switch crystal 38 by the focusing lens 32. The Q-switch crystal 38 is a saturable absorber of light in the wavelength range at about 1.5 micrometers, and more specifically from about 1.4 to about 1.65 micrometers.

Figure 2:
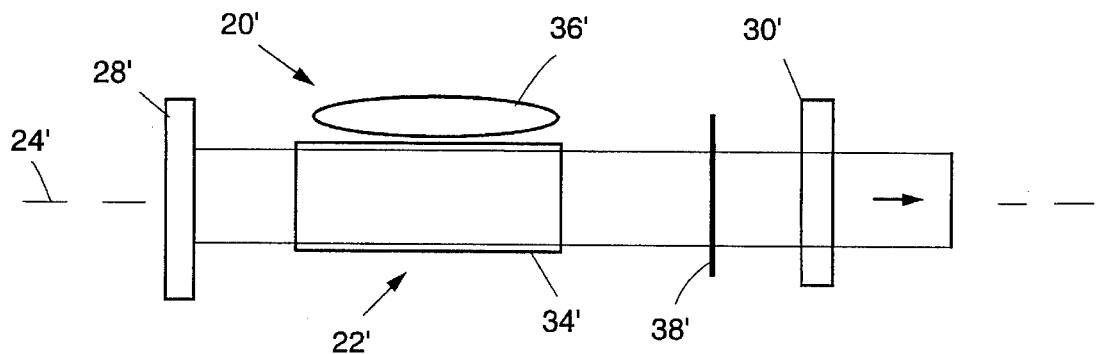
FIG. 2 is a schematic drawing of a second laser system according to the invention.

FIG. 2 depicts another laser system 20', which is similar to the laser system 20 and whose description is incorporated here, except as will be discussed next. The elements of the laser system 20' that correspond to the elements of the laser system 20 are denoted by the same reference numerals as in the laser system 20, except with a prime (') affixed thereto. In the laser system 20' having an unfocused plane-parallel resonator cavity, the outcoupler mirror 30' is flat rather than curved and there is no focusing lens, so that there is no focusing effect in the laser system 20'.

The Q-switch crystal 38 or 38' is formed of a host material with a sufficient concentration of uranium ions, preferably $U^{2+}$ ions, therein to act as a saturable absorber in the wavelength range of from about 1.4 to about 1.65 micrometers. The Q-switch material desirably has a higher absorption cross section, preferably a much higher absorption cross section, than the stimulated emission cross section of the lasing element 34.

The host material is preferably a fluoride salt. Most preferably, the host material is one of the di-fluorides such as calcium fluoride ($CaF_2$), strontium fluoride ($SrF_2$), or barium fluoride ($BaF_2$). Of these hosts, $CaF_2$ and $SrF_2$ are particularly favored because the $U^{2+}$ cross section is higher in these hosts than in $BaF_2$, and the damage threshold and hardness of these hosts is higher than for $BaF_2$. The crystal structure of these fluorides is the cubic fluorite structure.

The preferred Q-switch crystals can therefore be described as uranium-doped calcium fluoride ($U^{2+}$:$CaF_2$), uranium-doped strontium fluoride ($U^{2+}$:$SrF_2$), and uranium-doped barium fluoride ($U^{2+}$:$BaF_2$).

Laser systems 20 and 20' like those in FIGS. 1 and 2 were built and operated to demonstrate the performance of the Q-switched laser system. The focused laser system 20 was used to demonstrate operability for an Er:YAG laser operating at 1.64 micrometers, and the unfocused laser system 20', was used to demonstrate operability for an Er:glass laser operating at 1.533 micrometers.

In the focused laser system 20, the laser resonator cavity was about 23.5 centimeters long. The flat mirror had a 100 percent reflectance. The curved outcoupler mirror had a 2.5 centimeter radius of curvature and a reflectance of 94 percent at a wavelength of about 1.53 micrometers. The converging lens had a focal length of 5 centimeters, and was positioned to provide a beam waist near the Q-switch crystal. This configuration is a stable resonator. The Er:YAG lasing element used for this demonstration was manufactured by the Crystal Products Division of Union Carbide. The Er:YAG rod had a diameter of about 6.4 millimeters and a length of about 76 millimeters. The Q-switch crystals were $U^{2+}$:$CaF_2$ and $U^{2+}$:$SrF_2$ with thicknesses of 4.0 and 2.5 millimeters, respectively. The crystals used as the Q-switches were purchased from Optovac Inc. The Er:YAG was longitudinally pumped using a free-running Er:glass laser at 1.53 μm. The duration of the 1.53 μm pump pulse was about 1 millisecond, FWHM.

In the unfocused laser system 20', the laser resonator cavity was about 14 centimeters long. The flat mirror 28' had a 100 percent reflectance. Three flat outcoupler mirrors 30' were used, having reflectances of 94 percent, 88 percent, and 82 percent, respectively, at a wavelength of about 1.53 micrometers. The lasing element used for the demonstration was a Kigre QE-7S Er:glass rod, having a diameter of 3 millimeters and a length of 50 millimeters. The Er:glass rod was pumped using a Xenon flash lamp. The Q-switch crystal was $U^{2+}$:$SrF_2$, and was flat and uncoated. Three different Q-switch crystals, of thicknesses 1.27 millimeters, 2.69 millimeters, and 9.12 millimeters, respectively were used. The flash lamp produced a flash lamp pulse of about 600 microseconds full width at half maximum.

The $U^{2+}$$SrF_2$ Q-switch had an absorption cross section of $7 \times 10^{-20}$ $cm^2$. This Q-switch crystal was used successfully with the flat-outcoupler mirror laser system 20' to achieve Q-switched pulses of 3 mJ and 60 nanoseconds full width at half-maximum (for the 2.69 millimeter thick crystal).

The unfocused laser system 20' was also operated with a $U^{2+}$:$CaF_2$ Q-switch with an absorption cross section of $7 \times 10^{-20}$ $cm^2$. The system achieved Q-switched pulses of 3 mJ and 21 nanoseconds full width at half-maximum without damage to the Q-switch.

Figure 3:
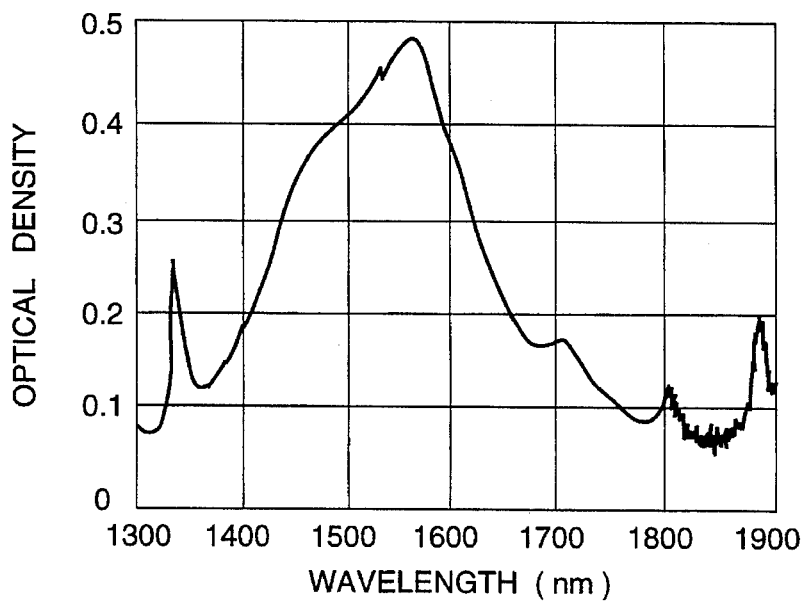
FIG. 3 is a graph of the absorption spectrum of $U^{2+}$:SrF$_2$ in the wavelength range of interest.

FIG. 3 depicts the absorption spectrum of the $U^{2+}$:$SrF_2$ crystal. Significant absorption is achieved over a range from about 1.4 to about 1.65 micrometers. This crystal type is therefore a saturable absorber and operable as a Q-switch over this wavelength range, as demonstrated by its operability with the Er:glass laser at 1.53 micrometers and the Er:YAG laser at 1.64 micrometers. $U^{2+}$:$CaF_2$ and $U^{2+}$:$BaF_2$ have similar absorption spectra.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A laser system, comprising:

a laser resonator cavity having a resonant axis;

a lasing element within the laser resonator cavity, the lasing element being selected from the group consisting of Er:yttrium-aluminum garnet and Er:glass;

means for optically pumping the lasing element; and a Q-switch crystal lying along the resonant axis within the laser resonator cavity, the Q-switch crystal comprising a host material having $U^{2+}$ ions doped therein.

2. The laser system of claim 1, wherein the laser resonator cavity comprises a flat mirror at a first end thereof, the flat mirror having a reflectivity of substantially 100% percent; and a curved outcoupler mirror at a second end thereof, the curved mirror having a reflectivity of less than 100 percent, and wherein the Q-switch crystal is positioned between the lasing element and the curved mirror.

3. The laser system of claim 2, further including a converging lens positioned between the lasing element and the Q-switch crystal.

4. The laser system of claim 1, wherein the laser resonator cavity comprises a flat mirror at a first end thereof, the flat mirror having a reflectivity of substantially 100% percent; and a flat outcoupler mirror at a second end having a thereof, the flat outcoupler mirror having a reflectivity of less than 100 percent, and wherein the Q-switch crystal is positioned between the lasing element and the flat outcoupler mirror.

5. The laser system of claim 1, wherein the means for optically pumping comprises a flash lamp.

6. The laser system of claim 1, wherein the Q-switch crystal comprises a fluoride host material.

7. The laser system of claim 1, wherein the Q-switch crystal comprises a fluoride host material selected from the group consisting of calcium fluoride, strontium fluoride, and barium fluoride.

8. A laser system, comprising:

a laser resonator cavity having a resonant axis;

a lasing element within the laser resonator cavity, the lasing element being selected from the group consisting of Er:yttrium-aluminum garnet and Er:glass;

means for optically pumping the lasing element; and a Q-switch crystal lying along the resonant axis within the laser resonator cavity, the Q-switch crystal comprising a saturable absorber selected from the group consisting of $U^{2+}$-doped calcium fluoride, $U^{2+}$-doped strontium fluoride, and $U^{2+}$-doped barium fluoride.

9. The laser system of claim 8, wherein the laser resonator cavity comprises a flat mirror at a first end thereof, the flat mirror having a reflectivity of substantially 100 percent; and a curved outcoupler mirror at a second end thereof, the curved mirror having a reflectivity of less than 100 percent, and wherein the Q-switch crystal is positioned between the lasing element and the curved mirror.

10. The laser system of claim 9, further including a converging lens positioned between the lasing element and the Q-switch crystal.

11. The laser system of claim 8, wherein the laser resonator cavity comprises a flat mirror at a first end thereof, the flat mirror having a reflectivity of substantially 100% percent; and a flat outcoupler mirror at a second end thereof, the flat outcoupler mirror having a reflectivity of less than 100 percent, and wherein the Q-switch crystal is positioned between the lasing element and the flat outcoupler mirror.

12. The laser system of claim 8, wherein the means for optically pumping comprises a flash lamp.

13. A laser system, comprising:

a laser resonator cavity having a resonant axis;

a lasing element within the laser resonator cavity, the lasing element emitting, under stimulation, light at a wavelength of from about 1.4 to about 1.65 micrometers;

means For optically pumping the lasing element; and a Q-switch crystal lying along the resonant axis within the laser resonator cavity, the Q-switch crystal comprising a host material having $U^{2+}$ ions doped therein, the Q-switch crystal being a saturable absorber of light of a wavelength of from about 1.4 to about 1.65 micrometers.

14. The laser system of claim 13, wherein the Q-switch crystal comprises a saturable absorber selected from the group consisting of $U^{2+}$-doped calcium fluoride, $U^{2+}$-doped strontium fluoride, and $U^{2+}$-doped barium fluoride.

15. A Q-switch for a laser comprising a host material crystal having $U^{2+}$ ions doped therein, the doped Q-switch crystal being a saturable absorber of light of a wavelength of from about 1.4 to about 1.65 micrometers.

16. The Q-switch of claim 15, wherein the Q-switch comprises $U^{2+}$-doped calcium fluoride.

17. The Q-switch of claim 15, wherein the Q-switch comprises $U^{2+}$-doped strontium fluoride.

18. The Q-switch of claim 15, wherein the Q-switch comprises $U^{2+}$-doped barium fluoride.

* * * * *